United States Patent
Yoshimura et al.

(10) Patent No.: US 6,751,745 B1
(45) Date of Patent: Jun. 15, 2004

(54) DIGITAL SYNCHRONIZATION CIRCUIT PROVIDED WITH CIRCUIT FOR GENERATING POLYPHASE CLOCK SIGNAL

(75) Inventors: Tsutomo Yoshimura, Hyogo (JP); Harufusa Kondoh, Hyogo (JP); Koichi Nishida, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 606 days.

(21) Appl. No.: 09/617,135

(22) Filed: Jul. 14, 2000

(30) Foreign Application Priority Data

Dec. 17, 1999 (JP) .............................. 11-359159

(51) Int. Cl.[7] ................................ G06F 1/04
(52) U.S. Cl. .................. 713/501; 713/401; 713/503
(58) Field of Search ................. 713/500, 501, 713/503, 400, 401

(56) References Cited

U.S. PATENT DOCUMENTS

| | | | | |
|---|---|---|---|---|
| 5,296,822 A | * | 3/1994 | Cockey, IV ................. 330/306 |
| 5,467,464 A | * | 11/1995 | Oprescu et al. ............. 713/400 |
| 5,790,609 A | * | 8/1998 | Swoboda ..................... 375/357 |
| 5,933,623 A | * | 8/1999 | Umemura et al. ........... 713/400 |
| 5,942,916 A | * | 8/1999 | Matsbara et al. ............. 326/83 |
| 5,990,673 A | * | 11/1999 | Forsberg ................... 324/76.62 |
| 6,035,409 A | * | 3/2000 | Gaudet ........................ 713/401 |
| 6,061,804 A | * | 5/2000 | Hirai ........................... 713/501 |
| 6,324,652 B1 | * | 11/2001 | Henderson et al. ......... 713/500 |

OTHER PUBLICATIONS

"A 30–MHz Hybrid Analog/Dialog Clock Recovery Circuit in 2–$\mu$m CMOS", by Kim et al., IEEE Journal of Solid–State Circuits, vol. 25, No. 6, Dec. 1990, pp. 1385–1394.

* cited by examiner

*Primary Examiner*—Dennis M. Butler
(74) *Attorney, Agent, or Firm*—McDermott, Will & Emery

(57) ABSTRACT

A digital synchronization circuit 1000 according to the present invention includes: a polyphase clock generation circuit outputting a plurality of clock signals having the sane frequency and different phases; a selection circuit selecting and outputting one of the plurality of clock signals in accordance with the selection signal; and a selection control circuit outputting a selection signal in accordance with a clock selection signal and the plurality of clock signals. The timing at which a value of the selection signal changes from the first value to the second value is in the period in which potential levels of the clock signals respectively represented by the first and second values are the same. Thus, an output clock signal without any hazard is output which is in synchronization with an input data signal of a plurality of clock signals.

8 Claims, 15 Drawing Sheets

DIGITAL SYNCHRONIZATION CIRCUIT PROVIDED WITH CIRCUIT FOR GENERATING POLYPHASE CLOCK SIGNAL

BACKGROUND OF THE INVENTION

1. Field of the Invention

The present invention relates to a digital synchronization circuit for generating an output clock signal which is in synchronization with a phase of an input data signal.

2. Description of the Background Art

A method of implementing a synchronization circuit for generating an output clock signal which is in synchronization with a phase of an input data signal serially transmitted from an external portion of a chip is disclosed in *IEEE JOURNAL OF SOLID-STATE CIRCUITS*, Vol. 25, No. 6, DECEMBER 1990, pp. 1385–1394, B. Kim, D. N. Helman and P. Gray, "A 30-MHz Hybrid Analog/Digital Clock Recovery Circuit in 2-$\mu$m CMOS."

Disclosed in the reference is a method of generating a desired clock signal by using a polyphase clock signal generated by a voltage controlled oscillator (hereinafter abbreviated as a VCO) including inverter columns connected in a ring like form and whose delay times are controllable.

A polyphase clock generation circuit generating the polyphase clock signal has a PLL (phase locked loop) structure which is controlled such that an oscillation frequency of the VCO is the same as an operation frequency of the input data signal which is input from the external portion of the chip. The signals are separately transmitted from nodes of inverter columns connected in the ring like form in the VCO, so that a plurality of clock signals having different phases but the same phase difference, i.e., polyphase clock signals, are output.

Referring to FIG. 14, a conventional digital synchronization circuit 9000 using polyphase clock signals will be described.

Conventional digital synchronization circuit 9000 includes: a polyphase clock generation circuit 910 outputting clock signals CLK1–CLKn to n signal lines; n-bit latch circuits 920 and 930; a clock phase determination circuit 950; and a selector 960 selecting and outputting one of n clock signals CLK1 to CLKn.

Latch circuit 920 includes n D type flip-flops FF1 to FFn. Flip-flops FFi (i=1 to n) is arranged in correspondence with clock signal CLKi.

Next, an arrangement of conventional digital synchronization circuit 9000 will be described. Clock signals CLK1 to CLKn are respectively connected to clock input terminals of flip-flops FF1 to FFn and the first to nth data input terminals of selector 960. Input data signals DIN are applied to all of data input terminals D of flip-flops FF1 to FFn.

Further, output signals from flip-flops FF1 to FFn are respectively applied to the first to the nth bit data input terminals of latch circuit 30. Clock signal CLKn is applied to the clock input terminal of latch circuit 930.

The n-bit output signal output from latch circuit 930 is applied to the input terminal of clock phase determination circuit 950.

A clock selection signal CSL from clock phase determination circuit 950 is applied to a control input terminal of selector 960, and an output clock signal OUTCLK is output from an output terminal of selector 960.

Now, an operation of conventional digital synchronization circuit 9000 will be described.

Clock signals CLK1 to CLKn having different phases and having the same frequency as that of input data signal DIN are output from polyphase clock generation circuit 910. Input data signals DIN are respective latched at flip-flops FF1 to FFn by clock signals CLK1 to CLKn. More specifically, input data signals DIN are sampled by clock signals CLK1 to CLKn, and the sampled data are retained in flip-flops FF1 to FFn.

The sampled data in FF1 to FFn are received by latch circuit 930 in the next stage by clock signal CLKn.

The n-bit data in latch circuit 930 is applied to clock phase determination circuit 950.

Here, clock phase determination circuit 950 determines the change in potential level of the signal which has been obtained by sampling input data signal DIN in time series, so that a clock selection signal CSL for selecting one of clock signals CLK1 to CLKn is output as a suitable clock signal for correctly sampling input data signal DIN.

Selector 960 selects one of clock signals CLK1 to CLKn in accordance with a value of dock selection signal CSL. The selected signal is output as output clock signal OUTCLK.

As described above, digital synchronization circuit 9000 selects one of clock signals CLK1 to CLKn having a phase in synchronization with input data signal DIN for outputting the selected signal as output clock signal OUTCLK. Thus, the synchronization circuit by digital control is achieved.

In the case of a digital synchronization circuit selecting one of clock signals CLK1 to CLKn by selector 960 for outputting the selected signal as output clock signal OUTCLK in synchronization with input data signal DIN, a hazard, which is an undesirable change in potential level of a signal in a short period of time, may be caused to output clock signal OUTCLK in switching clock signals at a certain transition timing of clock selection signal CSL.

The hazard caused to output clock signal OUTCLK will be described with reference to FIG. 15.

Assume that, at a time t100, the clock signal selected by selector 960 in accordance with the value of clock selection signal CSL switches from clock signal CLKc to CLKc+1. Further, assume that potentials of clock signals CLKc and CLKc+1 are both at an "H" level. Here, c=1, 1<c <n−2 (c: integer) or c=n−2.

At the time, potentials of clock signals CLKc and CLKc+1 are both at the "H" level, so that even if the signal selected by selector 960 is switched, no hazard is caused to output clock signal OUTCLK.

Next, at a time t101, assume that the clock signal selected by selector 960 in accordance with the value of clock selection signal CSL switches from clock signal CLKc+1 to CLKc+2. Further, assume that the potential level of clock signal CLKc+1 changes from an "L" level to the "H" level shortly before time t101, and the potential level of clock signal CLKc+2 changes from the "L" to "H" level shortly after time t101.

Then, the potential level of output clock signal OUTCLK from selector 960 changes from the "L" to "H" level shortly before time t101, then to the "L" level at t101, and further to "H" level shortly after the t101.

More specifically, a hazard is caused to the potential of output clock signal OUTCLK, that is characterized by undesirable changes in potential level in a short period of time.

The hazard caused to output clock signal OUTCLK would adversely affect the operation of the external circuit receiving output clock signal OUTCLK.

SUMMARY OF THE INVENTION

Therefore, an object of the present invention is to provide a digital synchronization circuit capable of outputting an output clock signal which is stably in synchronization with an input data signal without causing a hazard.

The digital synchronization circuit according to one aspect of the present invention includes: a clock generation circuit generating a plurality of clock signals having substantially the same frequency and having different phases; a selection circuit selectively outputting corresponding one having plurality of clock signals in accordance with a first selection signal; a clock determination circuit sampling the input data signal using the plurality of clock signals and selecting one of the plurality of clock signals based on the sampling result for outputting a second selection signal indicating the selection result; and a selection control circuit adjusting a timing at which the second selection circuit changes and outputting the first selection signal. The selection control circuit changes a value of the first selection signal from a first value to a second value in a period in which potentials of clock signals represented by the first and second values match in response to the change in value of the second selection signal from the first value to the second value.

Preferably, the selection control circuit includes: a clock selection circuit selectively outputting a clock signal represented by the value of the second selection signal of the plurality of clock signals; and a latch circuit latching the second selection signal and outputting the first selection signal in accordance with an output from the clock selection circuit.

Preferably, the selection control circuit includes a clock selection circuit having a plurality of first data input terminals respectively arranged in correspondence with the plurality of clock signals and supplied with respective clock signals, a first control input terminal supplied with the second selection signal, and a first output terminal. The clock selection circuit selects of the plurality of first data input terminals in accordance with the second selection signal for outputting the clock signal applied to the selected first data input terminal from the first output terminal. The selection control circuit further includes a latch circuit having a clock input terminal receiving the clock signal output from the first output terminal, a second data input terminal supplied with the second selection signal and a second output terminal. The latch circuit latches the second selection signal in accordance with an input to the clock input terminal for outputting the first selection signal from the second output terminal. The selection circuit includes a plurality of third data input terminals respectively arranged in correspondence with the plurality of clock signals and supplied with corresponding clock signals, a second control input terminal supplied with the second selection signal, and a third output terminal. The selection circuit selects one of the plurality of third data input terminals in accordance with the first selection signal for outputting the clock signal supplied to the selected third data input terminal from the third output terminal.

Particularly, the digital synchronization circuit further includes a plurality of signal lines transmitting the plurality of clock signals which are connected to the plurality of the first and third data input terminals such that the clock signals respectively represented by values of the second and first selection signals and input to the first and third data input terminals are the same when the values of the second and first selection signals are the same. Alternatively, the plurality of signal lines are connected to the plurality of first and third data input terminals such that there is a prescribed phase difference in the clock signals respectively represented by the values of the second and first selection signals and input to the first and third data input terminals when the values of the second and first selection signals are the same.

Preferably, the clock determination circuit selects one of the plurality of clock signals that changes in a prescribed relationship with respect to a transition timing of the input data signal, and outputs the second selection signal representing the selected clock signal. Particularly, the clock determination circuit selects one of the plurality of clock signals that rises or falls at the timing which is the closest to a prescribed timing of the input data signal in an input period.

According to the digital synchronization circuit, the value of the first selection signal can be changed at a timing different from that at which the value of the second selection signal is changed.

Accordingly, a transition in the first selection signal is achieved when potentials of two clock signals to be switched are the same, so that a clock signal without any hazard is obtained as an output from the selection circuit.

A digital synchronization circuit according to another aspect of the present invention includes: a clock generation circuit generating a plurality of clock signals having substantially the same frequency and having different phases; a clock determination circuit sampling an input data signal using the plurality of clock signals and selecting one of the plurality of clock signals based on the sampling result for outputting a selection signal indicating the selection result; a selection circuit selecting and outputting one of the plurality of clock signals having a prescribed phase difference with respect to the clock signal represented by the value of the selection signal; and a logic circuit eliminating and outputting a high frequency component from an output from the selection circuit.

Preferably, a prescribed amount of time is required after input of the signal to the selection circuit and before output of the corresponding signal from the logic circuit. The selection circuit selects a clock signal with a phase which is advanced with respect to that of the clock signal represented by the value of the selection signal by a prescribed amount of time.

Particularly, the selection circuit includes a plurality of data input terminals respectively arranged in correspondence with the plurality of clock signals and supplied with corresponding clock signals, a control input terminal supplied with the selection signal, and an output terminal. The selection circuit selects one of the plurality of data input terminals that is supplied with the clock signal having a prescribed phase difference with respect to the dock signal represented by the value of the selection signal for outputting the clock signal applied to the selected data input terminal from the output terminal.

Alternatively, the selection circuit may include a calculation circuit shifting the value of the selection signal by an amount corresponding to the prescribed phase difference and a circuit including a plurality of data input terminals respectively arranged in correspondence with the plurality of clock signals and supplied with corresponding clock signals; a control input terminal supplied with an output from the calculation circuit and output terminal. The circuit selects one of the plurality of data input terminals that is supplied with a clock signal represented by the value of the output from the calculation circuit for outputting the clock signal applied to the selected data input terminal from the output terminal.

Preferably, the clock determination circuit selects one of the plurality of clock signals that changes in a prescribed relationship with respect to a transition timing of the input data signal for outputting the selection signal representing the selected clock signal. Particularly, the clock determination circuit selects one of the plurality of clock signals that rises or falls at a timing which is the closest to a prescribed timing of the input data signal in an input period.

Preferably, the logic circuit includes a filter circuit for eliminating a high frequency component, and a waveform adjusting circuit for adjusting an output waveform from the filter circuit. The waveform adjusting circuit includes a logic gate circuit.

According to the above mentioned digital synchronization circuit, the clock signal having a phase advanced by a propagation delay time caused by the selection circuit and the logic circuit is selected, and the signal obtained by eliminating the high frequency component from the selected clock signal is output. Thus, an adverse affect of the propagation delay time caused by the selection circuit and the logic circuit is eliminated and the clock signal without any hazard can effectively be obtained.

Further, the filter circuit for eliminating the high frequency component from the selection output signal and the waveform adjusting circuit for adjusting undesired variations in the output signal waveform from the filter circuit are provided, whereby a signal without being adversely affected by a hazard is effectively and readily be obtained even if a hazard is caused to the output signal from the selection circuit.

Furthermore, the waveform adjusting circuit is in the form of the logic gate circuit, so that a circuit scale can effectively be reduced.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
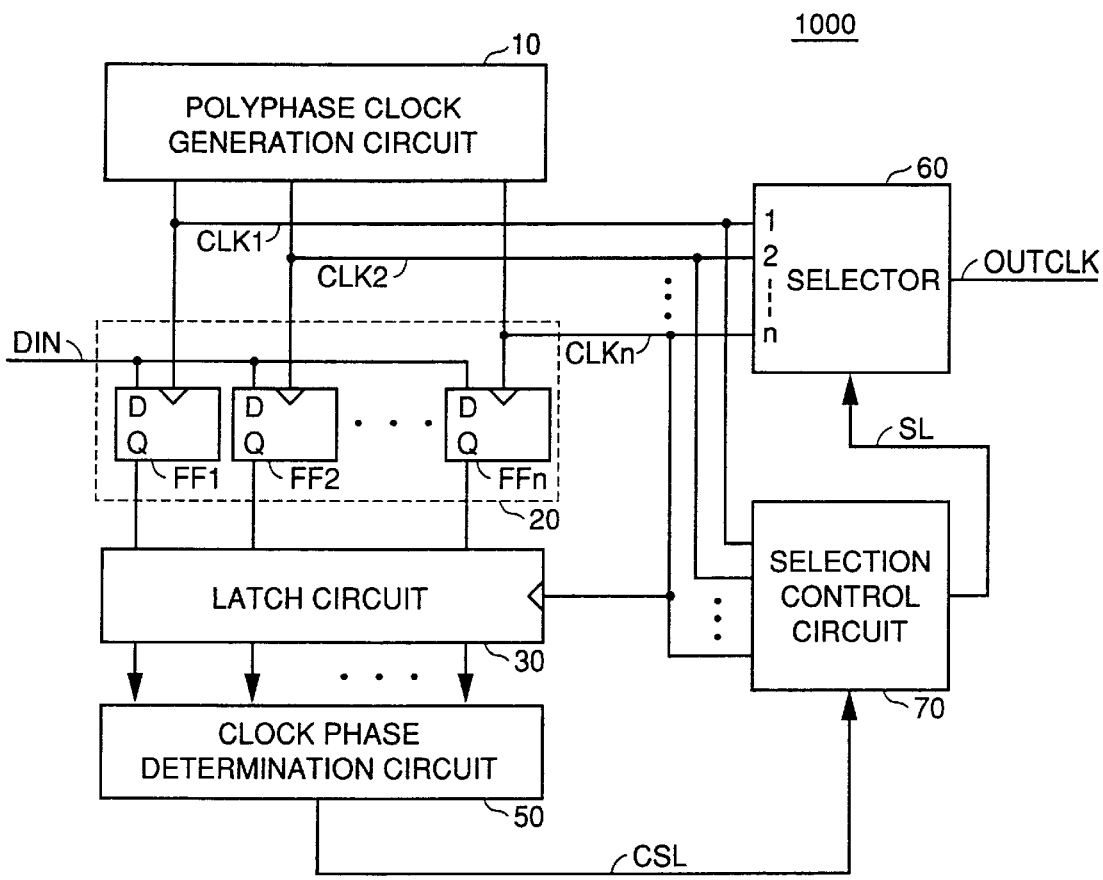
FIG. 1 is a block diagram showing a structure of a digital synchronization circuit 1000 according to a first embodiment of the present invention.

Now, embodiments of the present invention will be described with reference to the drawings. The same or corresponding portions are denoted by the same reference characters throughout the drawings, and therefore description thereof will not be repeated.

First Embodiment

A digital synchronization circuit 1000 of the first embodiment will be described with reference to FIG. 1. Digital synchronization circuit 1000 includes: a polyphase clock generation circuit 10 outputting clock signals CLK1 to CLKn; signal lines transmitting clock signals CLK1 to CLKn; an n-bit latch circuit 20 sampling input data signal DIN; an n-bit latch circuit 30 latching an output from latch circuit 20; a clock phase determination circuit 50 supplied with an output from latch circuit 30 for outputting a k-bit clock selection signal CSL; a selector 60 selecting and outputting one of clock signals CLK1 to CLKn; and a selection control circuit 70 supplied with clock signals CLK1 to CLKn and clock selection signal CSL for outputting a selection signal SL controlling selection by selector 60.

Latch circuit 20 includes n D type flip-flops FF1 to FFn. Flip-flop FFi (i=1 to n) is arranged in correspondence with clock signal CLKi.

Bit data are serially input as input data signal DIN.

Polyphase clock generation circuit 10 includes, while not shown in the drawing, an oscillator generating a signal having the same frequency as a receiving frequency corresponding to a receiving period of bit data of input signal DIN.

Figure 2:
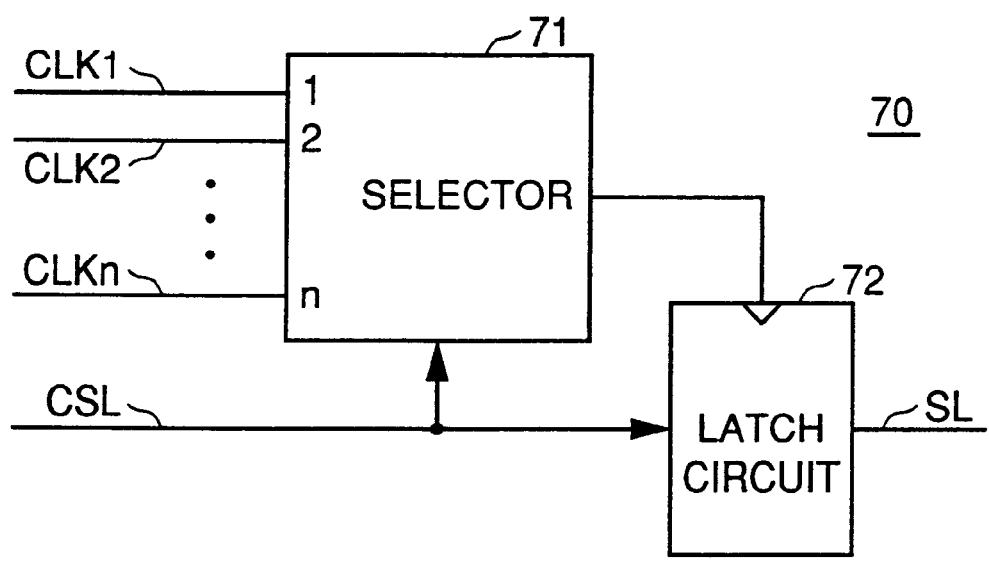
FIG. 2 is a diagram showing a structure of a selection control circuit 70 according to the first embodiment of the present invention.

An internal structure of selection control circuit 70 will be described with reference to FIG. 2.

Selection control circuit 70 includes a selector 71 supplied with clock signals CLK1 to CLKn, and a k-bit latch circuit 72 supplied with clock selection signal CSL for outputting selection signal SL.

Next, an arrangement of digital synchronization circuit 1000 of the first embodiment will be described. Clock signals CLK1 to CLKn are respectively applied to clock input terminals of flip-flops FF1 to FFn, the first to nth data input terminals of selector 60 and the first to nth data input terminals of selector 71.

Input data signals DIN are applied to all of data input terminals D of flip-flops FF1 to FFn. Clock signal CLKn is applied to a clock input terminal of latch circuit 30.

Output signals from flip-flops FF1 to FFn are respectively applied to the first to nth bit data input terminals of latch circuit 30.

The first to nth bit output signals of latch circuit 30 are respectively applied to n-bit input terminals of clock phase determination circuit 50.

A k-bit clock selection signal CSL is output from an output terminal of clock phase determination circuit 50. The output terminal of clock phase determination circuit 50 is connected to a control input terminal of selector 71 and a data input terminal of latch circuit 72. The ith data input terminal (i=1 to n: where i is a data input number) of selector 71 receives clock signal CLKi. An output terminal of selector 71 is connected to a clock input terminal of latch circuit 72.

A k-bit selection signal SL is output from the k-bit output terminals of latch circuit 72. The k-bit output terminals are connected to the k-bit control input terminals of selector 60. An output clock signal OUTCLK is output from the output terminal of selector 60.

Next, an operation of digital synchronization circuit 1000 of the first embodiment will be described.

Clock signals CLK1 to CLKn, which are polyphase clock signals output from polyphase clock generation circuit 10, have the same frequency as an input data frequency of input data signal DIN.

Phases of clock signals CLK2, CLK3, . . . , CLKn are respectively delayed by $2\pi/n$, $2\pi/n*2$, $2\pi/n*3$, . . . , $2\pi/n*(n-1)$ from the phase of clock signal CLK1.

More specifically, among clock signals CLK1 to CLKn, a phase difference between two clock signals having consecutive clock signal numbers is constant, or $2\pi/n$.

Input data signals DIN are respectively latched at flip-flops FF1 to FFn by clock signals CLK1 to CLKN.

More specifically, flip-flop FF1 samples and retains bit data of input data signal DIN at a timing a potential level of clock signal CLK1 changes from the "L" to "H" level.

Then, when a time required for the phase of the clock signal to change by $2\pi/n$ is elapsed after the potential of clock signal CLK1 attains to the "H" level, the potential level of clock signal CLK2 changes from the "L" to "H" level. Flip-flop FF2 receives samples and retains input data signal DIN at a timing at which clock signal CLK2 rises.

Similarly, input data signal DIN is sampled every time when a time required for a phase of a clock signal to change by $2\pi/n$, and the sampled data is retained in the corresponding flip-flop.

Thus, input data signal DIN is sampled by clock signals CLK1 to CLKn in time series, and the sampling results are stored in flip-flops FF1 to FFn.

Then, each of n-bit output signals from flip-flops FF1 to FFn, which are the sampling results of input data signal DIN, are received by and retained in latch circuit 30 in the next stage by clock signal CLKn.

Here, the content retained in latch circuit 30 will be described.

For example, assume that input data signals DIN whose levels of potentials change from the "L to "H" level are sampled by clock signals CLK1 to CLKn. At the time, "0" is stored in each of the first to the jth bits (0<j<n) and "1" is stored in each of the (j+1)th to the nth bits in latch circuit 30.

In other words, the values of the bits starting from the first bit are "0, 0, . . . , 0, 1, 1, . . . , 1."

Conversely, when the levels of potentials of input data signals DIN change from the "H" to "L" level, "1" is stored in each of the first to the jth bits and 0 is stored in each of the (j+1)th to the nth bits.

In other words, the values of the bits starting from the first bit are "1, 1, . . . , 1, 0, 0, 0, . . . , 0."

If there is no change in potential of input data signals DIN, the values retained in the first to the nth bits of latch circuit 30 becomes all "0" or "1."

The n-bit data retained in latch circuit 30 is applied to clock phase determination circuit 50. Clock phase determination circuit 50 determines an optimum timing of the phase clock signal for correctly sampling input data signal DIN in accordance with the n-bit signal output from latch circuit 30 in which the signal obtained by sampling input data signal DIN in time series is retained.

One of clock signals CLK1 to CLKn is selected as having a timing which is the closest to the determined optimum timing, and clock selection signal CSL indicating a value i of a clock signal number of selected clock signal CLKi is output from clock phase determination circuit 50.

More specifically, clock phase determination circuit 50 receives the n-bit output data from latch circuit 30 and determines a transition point at which the value of the bit changes from "0" to "1," starting from the first bit. If the transition point is at the ith bit, corresponding clock signal CLKi is selected.

Alternatively, clock phase determination circuit 50 determines a transition point at which the value of the bit changes from "1" to "0," starting from the first bit. If the transition point is at the ith bit, corresponding clock signal CLKi is selected.

A timing clock signal CLKi that is selected from the plurality of clock signals based on the transition point from "0" to "1" rises is the closest to a transition timing of the level of input data signal DIN from the "L" to "H" level.

Here, assume that a duty ratio (a percentage of each of "H" and "L" periods in one period) of each of clock signals CLK1 to CLKn is substantially 50%. In this case, the timing clock signal CLKi falls would be in the middle of a transition timing (one period) of the input data signal.

Then, input data signal DIN is latched at the timing clock signal CLKi falls, so that the input data signal can be received at a timing allowing the largest operation margin.

It is noted that the same applies to clock signal CLKi selected based on the transition point from "1" to "0."

Thus, clock phase determination circuit 50 selects one clock signal CLKi which allows a time ts in the middle timing of bit data serially input as input data signals DIN and the timing of the rising or falling edge of clock signals CLK1 to CLKn to be the closest. A value i of a clock signal number of selected clock signal CLKi is output from clock phase determination circuit 50 as k-bit clock selection signal CSL.

Then, one of clock signals CLK1 to CLKn is selected by selector 71 to which clock selection signal CSL has been applied, and the selected signal is output from the output terminal of selector 71.

Clock selection signal CSL is latched at latch circuit 72 at a timing the signal output from selector 71 rises, and k-bit selection signal SL is output from the k-bit output terminal of latch circuit 72.

One of clock signals CLK1 to CLKn is selected by selector 60 to which selection signal has been applied, and the selected signal is output as an output clock signal OUTCLK from the output terminal of selector 60.

It is noted that latch circuit 72 includes a D flip-flop of an edge trigger type.

An operation of digital synchronization circuit 1000 according to the first embodiment of the present invention will be described in detail with reference to FIG. 3.

Clock phase determination circuit 50 selects a clock signal for sampling input data signal DIN at a time ts. Time ts is in the middle of the time between t2 and t5, where t2 and t5 are transition timings (transition points) of input data signal DIN. Clock selection signal CSL indicating the selected clock signal is output from clock phase determination circuit 50.

One of clock signals CLK1 to CLKn applied to selector 71 is selected in accordance with k-bit clock selection signal CSL.

Figure 3:
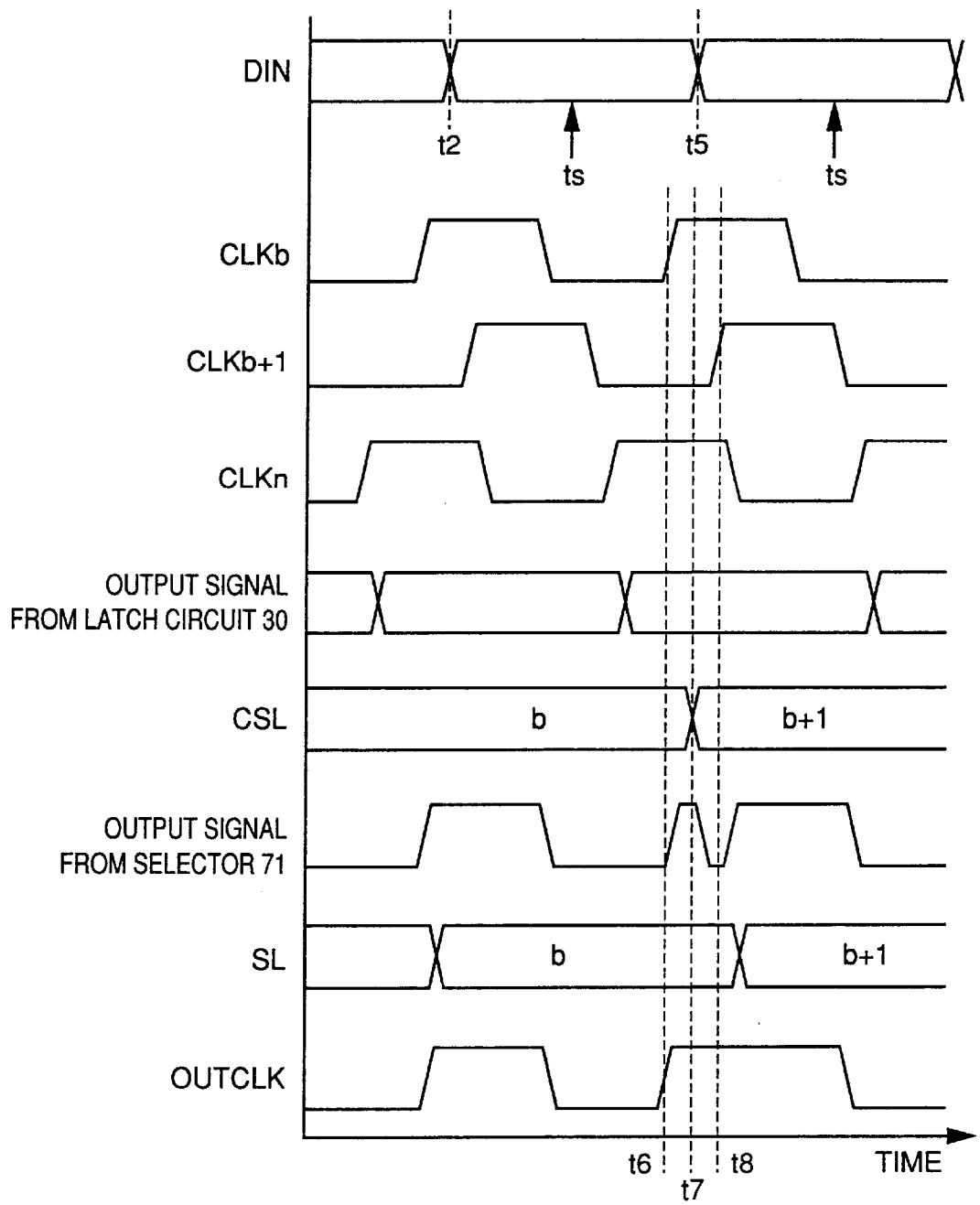
FIG. 3 is a timing chart shown in conjunction with an operation of digital synchronization circuit 1000 according to the first embodiment of the present invention.

Referring to FIG. 3, assume that, at a time 7, a value of clock signal CSL changes to a value representing clock signal CLKb+1 from that representing clock signal CLKb.

Further, assume that time t7 is between time t6 at which clock signal CLKb rises and time t8 at which clock signal CLKb+1 rises and which is later than time t6. Here, b=1, 1<b<n−1 or b=n−1, where b is an integer.

As the value of clock selection signal CSL represents clock signal CLKb before time t6, selector 71 selects and outputs clock signal CLKb.

Further, a value representing clock signal CLKb is retained in latch circuit 72 latching the value of clock selection signal CSL. As the value of selection signal SL, which is an output from latch circuit 72, represents clock signal CLKb, clock signal CLKb is selected by selector 60 and output as an output clock signal OUTCLK.

At time t6, the value of clock selection signal CSL represents clock signal CLKb. At the time, the potential level of clock signal CLKb changes from the "L" to "H" level, the potential level of an output signal from selector 71 also changes from the "L" to "H" level.

In response to the change in level of output signal from selector 71 from "L" to "H," latch circuit 72 receives the value of clock selection signal CSL. At the time, the received value represents clock signal CLKb, so that clock signal CLKb is selected by selector 60 and output as output clock signal OUTCLK.

At time t7, the value of clock selection signal CSL changes to the value representing clock signal CLKb+1 from the value representing clock signal CLKb.

At the time, as the potential of clock signal CLKb+1 is at the "L" level, the potential level of the output signal from selector 71 changes from "H" to "L."

It is noted that the value received at the time t6, i.e., the value representing clock signal CLKb, is retained in latch circuit 72.

Accordingly, clock signal CLKb is selected by selector 60 and output as output clock signal OUTCLK.

At time t8, the value of clock selection signal CSL represents clock signal CLKb+1. At the time, as the potential level of clock signal CLKb+1 changes from "L" to "H," the potential level of the output signal from selector 71 also changes from "L" to "H."

In response to the change in level of the output signal from selector 71 from "L" to "H," latch circuit 72 receives the value of clock selection signal CSL. The received value changes from the value representing clock signal CLKb to that representing clock signal CLKb+1.

As a result, clock signal CLKb+1 is selected by selector 60 and output as output clock signal OUTCLK.

It is noted that each of clock signals CLK1 to CLKn, polyphase clock signals, have the same frequency as the input data frequency of input data signal DIN. However, the relationship between the clock signal frequency and the input data frequency may be changed.

More specifically, clock signals CLK1 to CLKn with the same frequency may have frequencies to some extent different from the input data frequency, or the input data frequency may be to some extent higher or lower than the frequency of clock signals CLK1 to CLKn.

The normal operation of the digital synchronization circuit according to the first embodiment can be achieved even in this case.

As described above, selection control circuit 70 including selector 71 and the latch circuit 72 is provided in digital synchronization circuit 1000.

One of clock signals CLK1 to CLKn is selected in accordance with clock selection signal CSL by selector 71, and the value of clock selection signal CSL is latched at latch circuit 72 at a timing the selected signal rises.

Then, one of clock signals CLK1 to CLKn is selected by selector 60 to which selection signal SL, an output from latch circuit 72, has been applied, and output as output clock signal OUTCLK.

As a result, even if a hazard is caused to the output from selector 71 the value of selection signal SL is maintained until the last one of a plurality of transition points caused by the hazard, since the clock signal selected in accordance with the value of clock selection signal CSL changes to the value representing clock signal CLKb+1 from the value representing clock signal CLKb.

More specifically, when output clock signal OUTCLK is switched from clock signal CLKb to clock signal CLKb+1 selection signal SL which switches at the last transition point caused by the hazard is applied in place of clock selection signal CSL to the control input terminal of selector 60.

Thus, the value of selection signal SL applied to the control input terminal of selector 60 is changed when the potentials of clock signal CLKb and CLKb+1 are the same, so that a stable output clock signal OUTCLK without any hazard can effectively be obtained.

Second Embodiment

Figure 4:
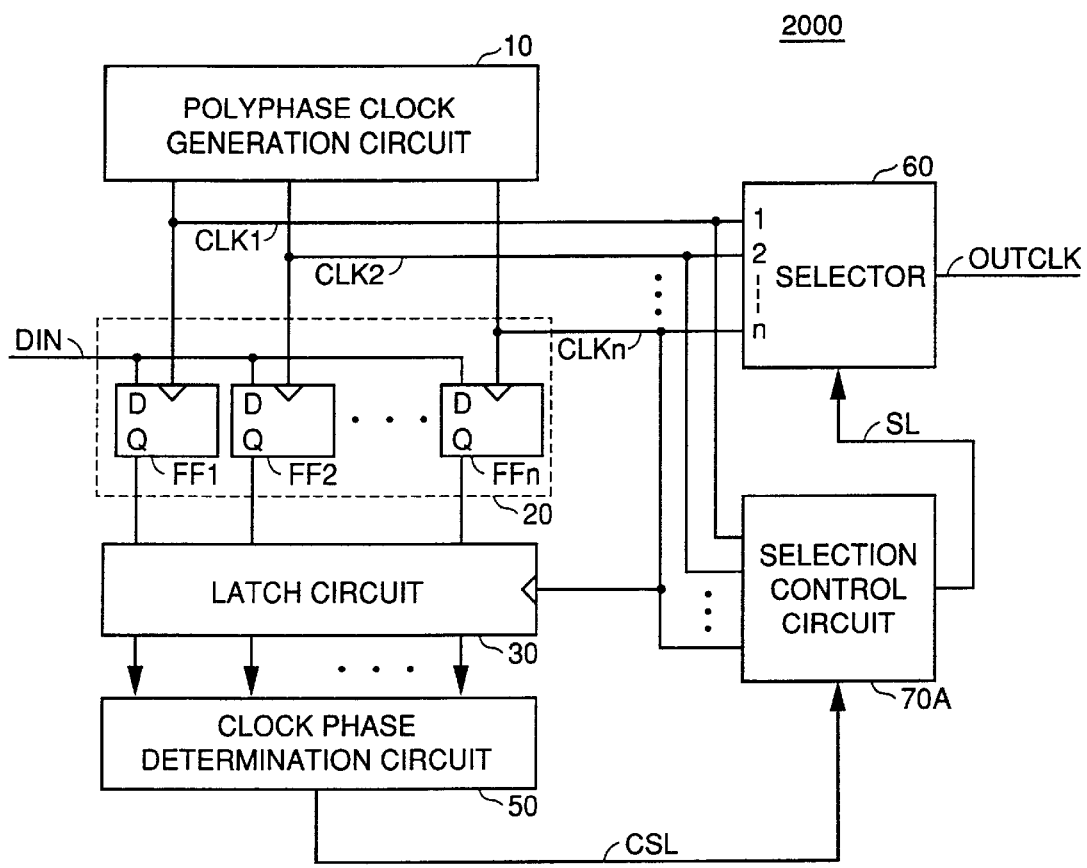
FIG. 4 is diagram showing a structure of a digital synchronization 2000 according to a second embodiment of the present invention.

A digital synchronization circuit 2000 according to the second embodiment is provided with a selection control circuit 70A in place of selection control circuit 70 of the first embodiment, as shown in FIG. 4. Other parts of the structure are the same as those of the first embodiment. More specifically, the structure of the digital synchronization circuit 2000 is the same as that of the first embodiment shown in FIG. 1, except for selection control circuit 70A.

Figure 5:
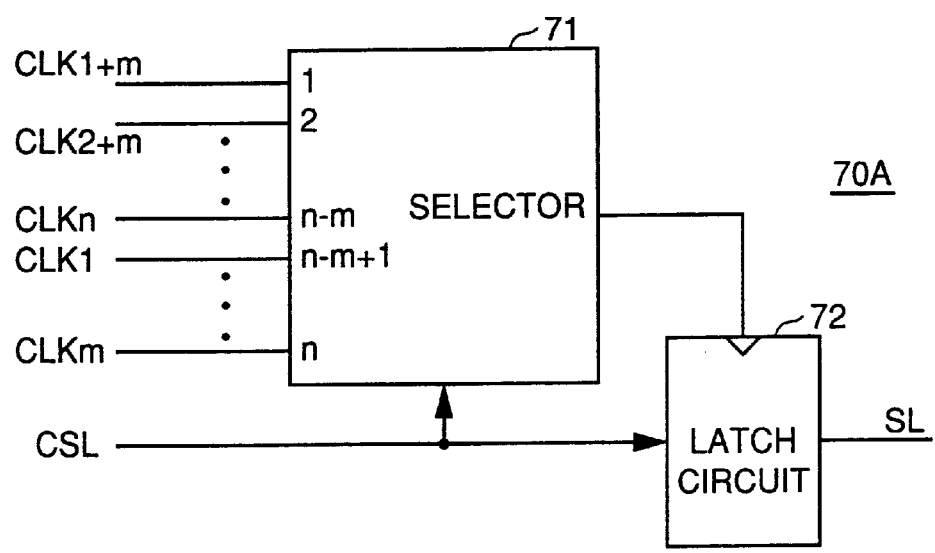
FIG. 5 is a diagram showing a structure of a selection control circuit 70A according to the second embodiment of the present invention.

The structure of selection control circuit 70A according to the second embodiment will be described with reference to FIG. 5. Selection control circuit 70A includes a selector 71 supplied with clock signals CLK1 to CLKn, and a k-bit latch circuit 72 supplied with k-bit clock selection signal CSL and outputting a k-bit selection signal SL.

Selection control circuit 70 is different from selection control circuit 70A in relationship between the data input data terminal and the clock signal in selector 71.

In selection control circuit 70A, clock signals CLK1 to CLKm are respectively applied to the (n−m+1)th data input terminal the (n−m+2)th data input terminal . . . , the nth data input terminal of selector 71.

Further, clock signals CLKm+1, CLKm+2, . . . , CLKn are respectively applied to the first data input terminal, the second data input terminal, the (n−m)th data input terminal of selector 71. Here, m is an integer, . . . , where 1<m<n.

The relationship among selector 71, latch circuit 72 and selector 60 is the same as that of the first embodiment except for the relationship between the data input terminal and the clock signal of selector 71.

It is noted that, regarding data input terminals of selector 71, the (m+1)th to nth data input terminals of selector 60 are respectively connected to the first to (n−m)th (the data input number is smaller by m) data input terminals of selector 71.

The first to the mth data input terminals of selector 60 are respectively connected to the (n−m+1) to the nth (the data input number is wrapped around by n and becomes smaller by m data input terminals of selector 71.

Now, an operation of the digital synchronization circuit of the second embodiment will be described. The first half of the operation of the digital synchronization circuit, corresponding to input data signals DIN by clock signals CLK1 to CLKn to output of clock selection signal CSL by clock phase determination circuit 50, is the same as in the first embodiment, and therefore description thereof is not repeated. The second half of the operation of digital synchronization circuit 2000 related to selection control circuit 70A will be described.

One of clock signals CLK1 to CLKn is selected by selector 71 in accordance with clock selection signal CSL, and the selected signal is output from the output terminal of selector 71.

Here, the relationship between data input numbers 1 to n indicating the first to the nth data input terminals of selector 71 and clock signal CLK1 to CLKn applied to the n data input terminals will be described with reference to FIGS. 6A and 6B.

Figure 6A:
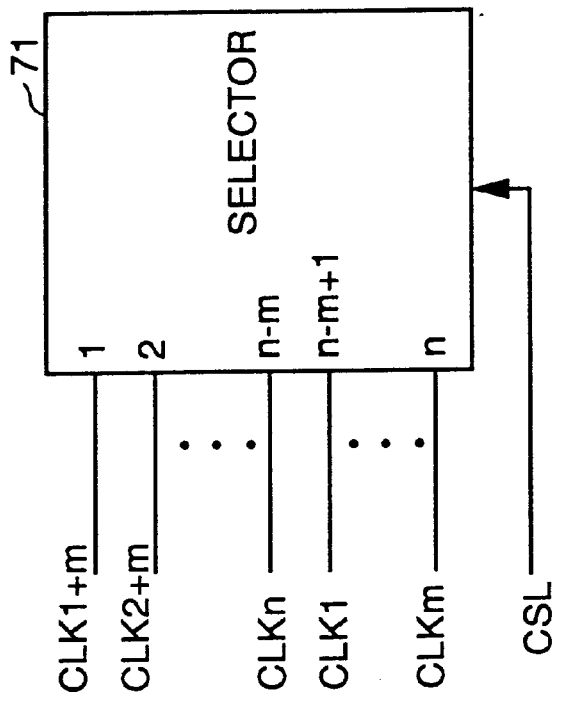
FIGS. 6A and 6B are diagrams shown in conjunction with a relationship between a clock signal and a data input terminal in a selector 71 of selection control circuit 70A.
Figure 6B:
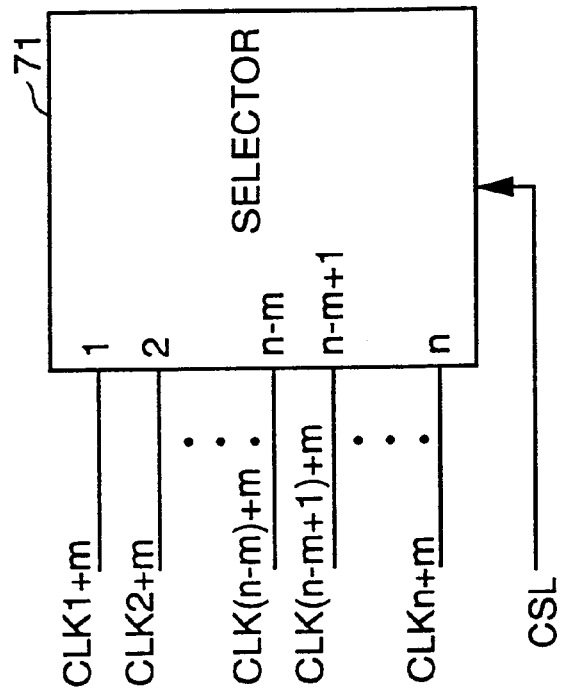

FIG. 6A shows an exemplary arrangement of the data input terminals and clock signals of selector 71, whereas FIG. 6B shows an actual arrangement according to the second embodiment.

It is noted that, when the value of k-bit block selection signal CSL applied to the control input terminal of selector 71 is 0, the first data input terminal of selector 71 is selected.

Similarly, when the value of k-bit selection signal SL applied to the control input terminal of selector 60 is 0, the first data input terminal of selector 60 is selected.

Referring to FIG. 6A, a clock signal CLK1+m whose phase is delayed by $2\pi.m/n$ from that of clock signal CLK1 is applied to the first data input terminal of selector 71. In addition, a clock signal CLK2+m whose phase is delayed by $2\pi.m/n$ from that of clock signal CLK2 is applied to the second data input terminal.

Similarly, a clock signal CLKn+m whose phase is delayed by $2\pi.m/n$ from that of a clock signal CLKn is applied to the nth data input terminal.

Selector 71 shown in FIG. 6A selects and output the clock signal whose phase is delayed by $2\pi.m/n$ from that of the case where clock signal numbers of clock signals CLK1 to CLKn and data input numbers of selectors 71 match.

Clock signal CLKn+1 is a signal whose phase is delayed by one period from that of clock signal CLK1 and equivalent to clock signal CLK1.

Thus, a clock signal CLK (n−m+1)+m applied to the (n−m+1)th data input terminal of selector 71 is equivalent to clock signal CLK1 whose phase is advanced by one period.

Clock signal CLKn+m applied to the nth data input terminal is equivalent to clock signal CLKm whose phase is advanced by one period.

If the clock signal shown in FIG. 6A is replaced by an equivalent clock signal, the arrangement of selector 71 according to the second embodiment would be as shown in FIG. 6B.

Accordingly, when clock selection signal CSL has a value representing clock signal CLKi, selector 71 selectively outputs clock signal CLKi+m (or a clock signal equivalent to the same) applied to the ith data input terminal.

Figure 7:
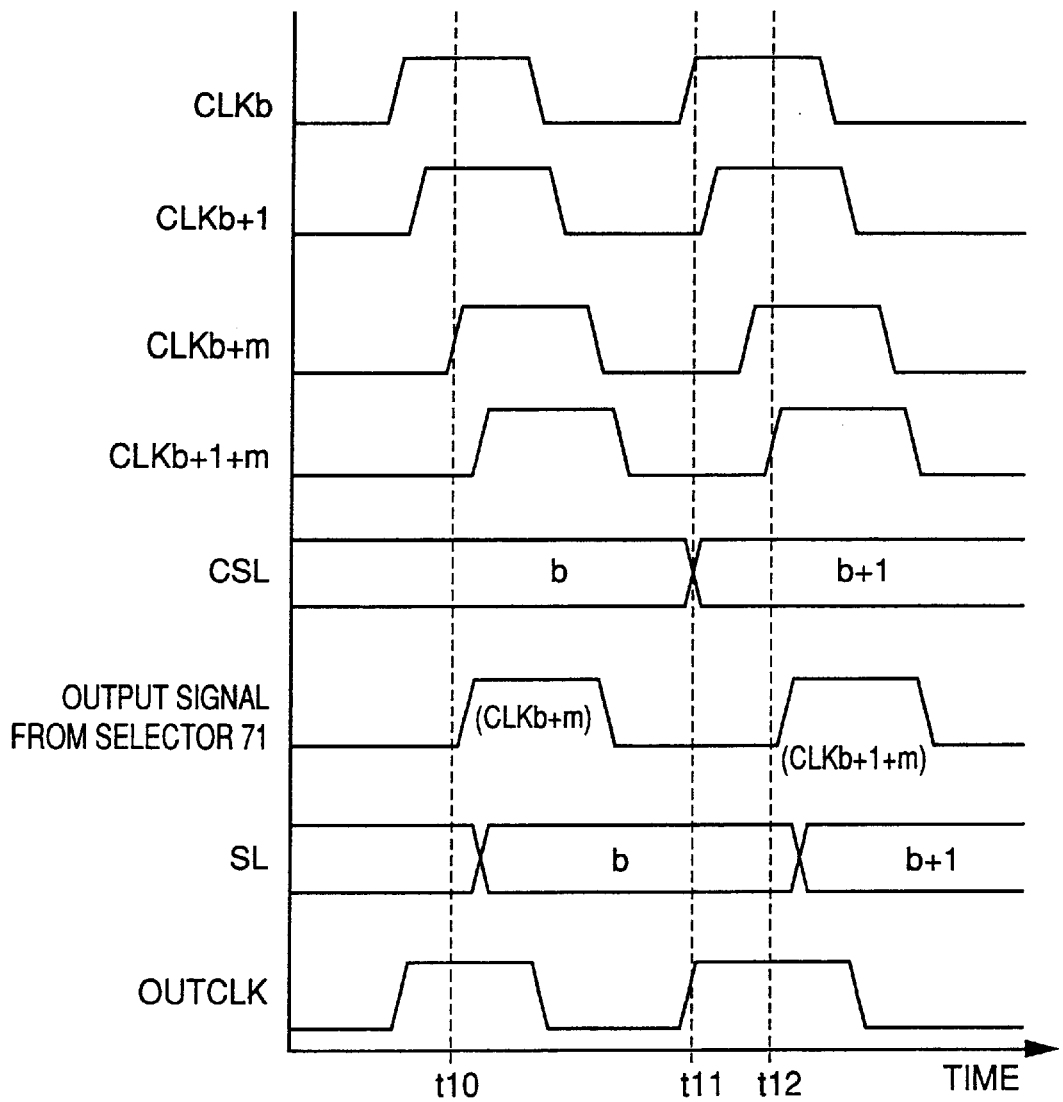
FIG. 7 is a timing chart shown in conjunction with the second half of the operation of digital synchronization circuit 2000.

Referring now to FIG. 7 showing the second half of the operation of digital synchronization circuit 2000, the value of clock selection signal CSL represents clock signal CLKp shortly before a time t10 to a time t11. The potential level of clock signal CLKb is changed from "L" to "H" shortly before time t11, and the potential level of clock signal CLKb+1 is changed from "L" to "H" shortly after time t11.

At the time, the value of clock selection signal CSL would be changed from the value representing clock signal CLKb to that representing clock signal CLKb+1 at time t11.

When clock selection signal CSL input to the control input terminal of selector 71 represents clock signal CLKb, clock signal CLKb+m which has been applied to the bth data input terminal of selector 71 is selected and output from selector 71.

Then, assume that the potential level of clock signal CLKb+m changes from "L" to "H" (at time t10<t11).

In accordance with the change in potential of clock signal CLKb+m at time t10, the potential of the output from selector 71 also attains to the "H" level from the "L" level.

Clock selection signal CSL is latched at latch circuit 72 at a timing the signal output from selector 71 rises. Selection signal SL, now representing clock signal CLKb, is output from the output terminal of latch circuit 72.

Clock selection signal CSL which has been input to selector 71 changes to have a value representing clock signal CLKb+1 at time t11, so that clock signal CLKb+1+m which has been input to the input terminal of the (b+1)th data input terminal of selector 71 is selected and output from selector 71.

Now, assume that the potential of clock signal CLKb+1+m attains to the "H" level from the "L" level at a time t12 (>t11).

It is noted that that the value of clock selection signal CSL represents clock signal CLKb+1 from time t11 to t12.

In accordance with the change in potential of clock signal CLKb+1+m at time t12, the potential level of the output from selector 71 also changes from the "L" to "H" level.

Clock selection signal CSL is latched at latch circuit 72 at a timing the signal output from selector 71 rises, and selection signal SL representing clock signal CLKb+1 is output from the output terminal of latch circuit 72.

Accordingly, selection signal SL changes to have a value representing clock signal CLKb+1 from clock signal CLKb at the timing.

One of clock signals CLK1 to CLKn is selected by selector 60 in accordance with selection signal SL, and the selected signal is output as clock signal OUTCLK from the output terminal of selector 60.

Immediately after time t12 at which the clock signal selected in accordance with the value represented by selection signal SL changes from clock signal CLKb to CLKb+1, potentials of clock signals CLKb and CLKb+1 both attain to the "H" level.

Accordingly, even if the clock signal selected by selection signal SL changes from CLKb to CLKb+1, the potentials of CLKb and CLKb+1 are the same at the transition timing, so that no hazard is caused to output clock signal OUTCLK output from selector 60.

It is noted that latch circuit 72 is a D flip-flop of an edge trigger type.

If the above described presumed condition is satisfied, more specifically, if a transition point of the rising edge is caused to clock signal CLKb represented by clock selection signal CSL immediately before time tl at which the value of clock selection signal CSL changes and a transition point of the rising edge is caused to clock signal CLKb+1 represented by clock selection signal CSL immediately after t11 at which the value of clock selection signal CSL changes, the optimum value of "m" would be as follows.

Here, assume that a duty of clock signals CLK1 to CLKn is 50%.

Clock signals CLKb+m and CLKb+1+m need only be signals whose phases are delayed by 90°, or $\pi/2$ with respect to those of clock signals CLKb and CLKb+1 respectively represented by clock selection signals CSL immediately before and after t11.

Then, the value of selection signal SL changes after a period of time required for the phase of the clock signal to change by $\pi/2$ after t11 at which clock selection signal CSL changes.

Accordingly, the timing at which the value of selection signal SL changes is approximately in the middle of a period in which potentials of CLKb and CLKb+1 are both at the "H" level, where the largest operation margin is obtained for selector 60.

More specifically, clock signals CLKb+m and CLKb+1+m whose phases are respectively delayed by $\pi/2$ with respect to those of CLKb and CLKb+1 need to be provided, so that the optimum value for "m" would be an integer which is the closest to $\pi/4$.

For example, if the value of "n" is 32, the optimum value for "m" would be 8.

Clock signals CLK9 and CLK10 are respectively applied to the first and second input terminals of selector 71. Subsequently, clock signal numbers of the clock signals to be input increases in accordance with the increasing data input number of selector 71.

Thus, a clock signal CLK32 is applied to the twenty-fourth data input terminal of selector 71. Further, a clock signal CLK1 is applied to the twenty-fifth data input terminal of selector 71 as a result of wrap around. Thereafter, clock signals CLK2 to CLK8 are respectively applied to the twenty-sixth to thirty-second data input terminals of selector 71.

Such a signal application manner allows the largest operation margin in terms of timing to prevent any hazard to the output signal from selector 71.

Thus, the timing at which the value of selection signal SL changes can be delayed by ¼ period with respect to that at which the value of clock selection signal CSL changes, whereby a hazard due to the change in value of selection signal SL of selector 60 is prevented.

As described above, digital synchronization circuit 2000 is provided with selection control circuit 70 including selector 71 to which the clock signal is applied such that the clock signal number and data input number differ by m and latch circuit 72 receiving clock selection signal CSL at its data input terminal for outputting selection signal SL.

As a result, the value of selection signal SL can be changed when potentials of two clock signals sequentially selected by selector 60, are both at the "H" or "L" level, so that output clock signal OUTCLK without any hazard can effectively be obtained.

Further, for actual implementation, only the order of clock signals CLK1 to CLKn applied to n data input terminals of selector 71 needs to be changed, without requiring additional H/W.

It is noted that, although a clock signal CLKi+m whose phase is delayed by $2\pi.m/n$ from that of clock signal CLKi, i.e., whose clock signal number is greater by "m," is applied to the ith data input terminal of selector 71, a clock signal whose phase is advanced by $2\pi.m/n$ with respect to that of clock signal CLKi, i.e., whose clock signal number is smaller by "m" may be applied.

In this way, the value of selection signal SL applied to selector 60 can be changed to when the potentials of two clock signals sequentially selected by selector 60 are both at the "H" or "L" level, so that output clock signal OUTCLK without any hazard can effectively be obtained.

Further in the case where the above mentioned presumed conditions are not satisfied, if a prescribed relationship is held between the timing at which the value of clock selection signal CSL changes and consecutive two transition points of two clock signals represented by the values before and after the change, the optimum "m" is obtained in the relationship.

More specifically, the timing at which the value of selection signal SL changes may be approximately in the middle of the period in which potentials of clock signals represented by values before and after the change are both at the "H" or "L" level.

To that end, the clock signal may be applied to selector 71 to minimize the possibility that the hazard occurs. The value of "m" at the time is optimum.

More specifically, based on the relationship between n data input terminals and clock signals CLK1 to CLKn of selector 71 of the first embodiment, the clock signal whose clock signal number is greater or smaller by the value corresponding to the difference in clock phase may be applied to the corresponding data input terminal of selector 71.

In this way, output clock signal OUTCLK without any hazard can effectively be obtained.

Third Embodiment

Figure 8:
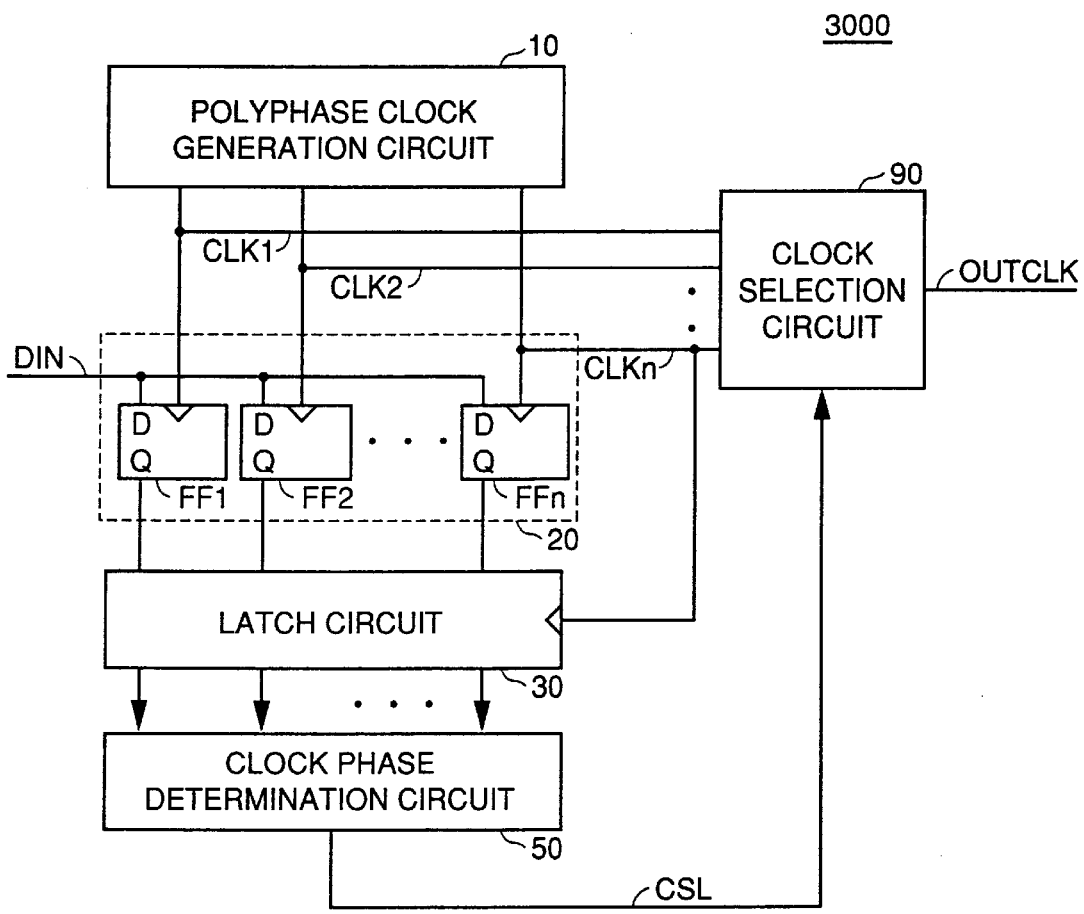
FIG. 8 is a block diagram showing a structure of a digital synchronization circuit 3000 according to a third embodiment of the present invention.

The structure of a digital synchronization circuit 3000 according to the third embodiment will be described with reference to FIG. 8.

Digital synchronization circuit 3000 according to the third embodiment is provided with a clock selection circuit 90 in place of selector 60 and selection control circuit 70 of the first embodiment. Other parts of the structure are the same as those of the first embodiment.

Figure 9:
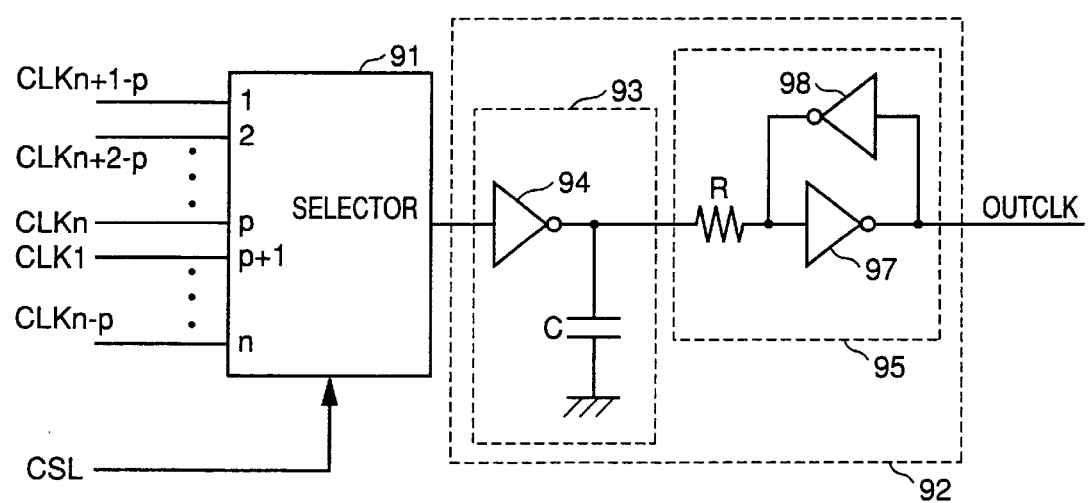
FIG. 9 is a diagram showing a structure of a selection circuit 90.

An internal structure of clock selection circuit 90 according to the third embodiment will be described with reference to FIG. 9.

Clock selection circuit 90 includes a selector 91 supplied with clock signals CLK1 to CLKn and clock selection signal CSL, and a waveform controlling circuit 92 supplied with an output signal from selector 91 for outputting output clock signal OUTCLK.

Waveform controlling circuit 92 includes a filter circuit 93 supplied with the output signal from selector 91, and a waveform adjusting circuit 95 adjusting a waveform of an output signal from filter circuit 93 for outputting output clock signal OUTCLK.

Filter circuit 93 includes an inverter 94 and a capacitor C. Waveform adjusting circuit 95 includes a resistor R and inverters 97, 98.

An arrangement of digital synchronization circuit 3000 according to the third embodiment will be described. The signal arrangement of polyphase clock generation circuit 10, latch circuits 20, 30, and clock phase determination circuit 50 are the same as in the first embodiment.

Clock signals CLK1 to CLKn, i.e., outputs from polyphase clock generation circuit 10, are respectively applied to clock input terminals of flip-flops FF1 to FFn.

Clock signals CLK1 to CLKn-p are respectively applied to the (p+1)th to nth data input terminals of selector 91.

Further, clock signals CLKn+1-p to CLKn are respectively applied to the first to the pth data input terminals of selector 91. Here, "p" is an integer, where 1<p<n.

A k-bit clock selection signal CSL is applied to a control input terminal of selector 91.

An output terminal of selector 91 is connected to an input terminal of inverter 94. An output terminal of inverter 94 is connected to one electrode of capacitor C and one electrode of resistor R. The other electrode of capacitor C is connected to a ground line.

The other electrode of resistor R is connected to an input terminal of inverter 97 and an output terminal of inverter 98.

Output clock signal OUTCLK is output from an output terminal of inverter 97. The output terminal of inverter 97 is connected to an input terminal of inverter 98.

Now, an operation of digital synchronization circuit 3000 according to the third embodiment will be described. The first half of the operation of digital synchronization circuit 3000, corresponding to sampling of input data signals DIN by clock signals CLK1 to CLKn to output of clock selection signal CSL by clock phase determination circuit 50, is the same as that of the first embodiment, and therefore description thereof will not be repeated.

The second half of the operation of digital synchronization circuit 3000 of the third embodiment will be described. In the second half of the operation, clock selection circuit 90 performs the main operation.

Here, referring to FIGS. 10A to 10B, a relationship between data input numbers indicating the first to the nth data input terminals of selector 91 and n clock signals CLK1 to CLKn applied to the n data input terminals will be described.

Figure 10A:
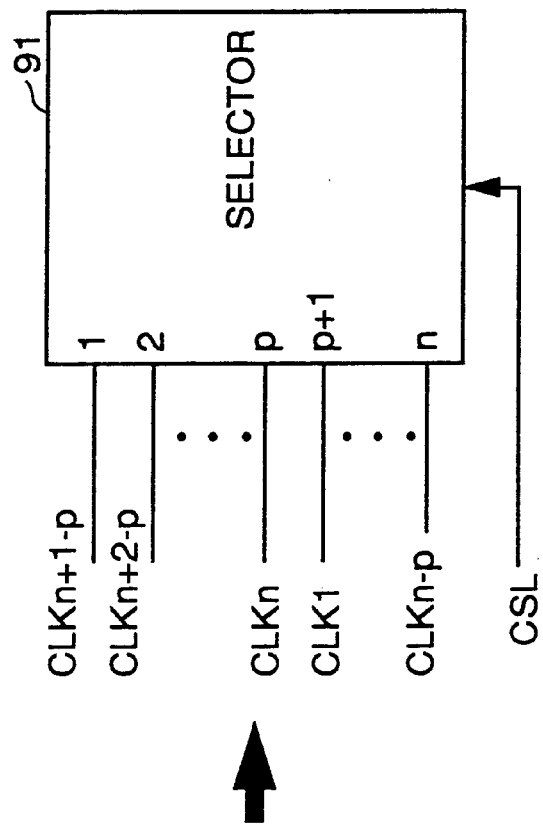
FIGS. 10A and 10B are diagrams shown in conjunction with a relationship between a clock signal and a data input terminal in a selector 91.

FIG. 10A shows an exemplary arrangement of the data input terminals of selector 91 and clock signals. FIG. 10B shows an actual arrangement in the third embodiment.

It is noted that when the value of k-bit clock selection signal CSL applied to the control input terminal of selector 91 is 0, the first data input terminal of selector 91 is selected.

Referring to FIG. 10A, clock signal CLK1-p whose phase is advanced $2\pi.p/n$ with respect to that of clock signal CLK1 is applied to the first data input terminal of selector 91. Further, clock signal CLK2-p whose phase is advanced by $2\pi.p/n$ with respect to that of clock signal CLK2 is applied to the second data input terminal.

Similarly, clock signal CLKn-p whose phase is advanced by $2\pi.p/n$ with respect to that of clock signal CLKn is applied to the nth data input terminal.

Selector 91 shown in FIG. 10A selects and outputs the clock signal whose phase is advanced by $2\pi.p/n$ as compared with the case where clock signal numbers of clock signals CLK1 to CLKn and data input numbers of selector 91 respectively match.

By the way, clock signal CLKn+1 is delayed by one period with respect to a clock signal CLK1, that is equivalent to clock signal CLK1.

Accordingly, clock signal CLK1-p applied to the first data input terminal of selector 91 is equivalent to clock signal CLKn+1-p which is delayed by one period with respect to clock signal CLK1-p.

Similarly, clock signal CLKp-p applied to the pth data input terminal is equivalent to clock signal CLKn which is delayed by one period with respect to clock signal CLKp-p. FIG. 10B shows an arrangement of selector 91 of the third embodiment in which the clock signals of FIG. 10A have been replaced by equivalent clock signals. Thus, selector 91 selectively outputs clock signal CLKi-p if the value of clock selection signal CSL is "i."

Next, the second half of the operation of digital synchronization circuit 3000 in connection with the operation of clock selection circuit 90 will be described with reference to FIG. 11.

Clock selection signal CSL, which is an output from clock phase determination circuit 50, is applied to the control input terminal of selector 91. As a result, one of clock signals CLK1 to CLKn is selected by selector 91, and the selected signal is output from the output terminal of selector 91.

The output signal from selector 91 is input to filter circuit 93. A high frequency component of the input signal is attenuated by a lowpass filter including an on resistance of an NMOS transistor or PMOS transistor of inverter 94 and capacitor C in filter circuit 93. The signal whose high frequency component has been attenuated is output from the output terminal of filter circuit 93.

The signal output signal from filter circuit 93 whose high frequency component has been attenuated is irregular in waveform, in which signal is input to waveform adjusting circuit 95. The irregular waveform of the signal is adjusted by waveform adjusting circuit 95. The signal which rapidly rises and falls is output from the output terminal of waveform adjusting circuit 95.

Waveform adjusting circuit 95 is a Schmitt circuit including resistor R and inverters 97, 98. Here, inverter 98 is a high resistance inverter having a drivability which is lower than that of inverter 97, and operates as a resistance or positive feedback.

Thus, waveform adjusting circuit 95 has a hysteresis property. A signal obtained by inverting the input signal is output when the potential of the input signal exceeds Vhh in the case of the rising waveform and when the potential of the input signal falls below Vhl in the case of the falling waveform. The output signal becomes output clock signal OUTCLK. Here, 0<Vhl<Vhh<Vdd.

In clock selection circuit 90, a signal propagation delay time d corresponding to the period between input of one of clock signals CLK1 to CLKn selected in accordance with the value of clock selection signal CSL and output clock signal OUTCLK is the propagation delay time required for the selected clock signal to pass through selector 91 forming clock selection circuit 90 as well as filter circuit 93 and waveform adjusting circuit 95.

Figure 11:
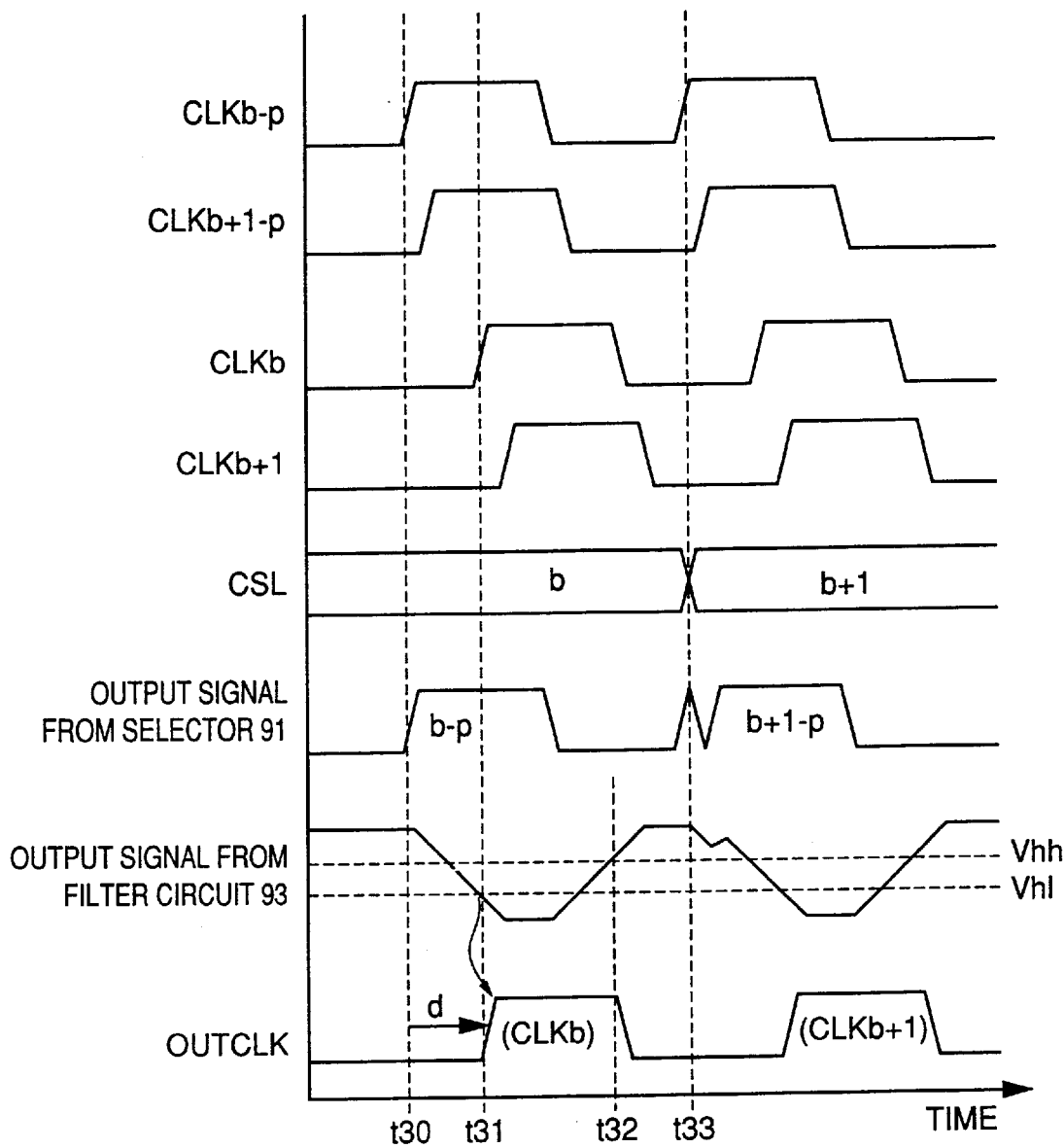
FIG. 11 is a timing chart shown in conjunction with an operation of digital synchronization circuit 3000.

For example, referring to FIG. 11, immediately before a time t30, the value of clock selection signal CSL attains to "b" designating the bth data input terminal of selector 91 to which clock signal CLKb-p has been applied. When the potential level of clock signal CLKb-p changes from "L" to "H" at time t30, clock signal CLKb-p is selected by selector 91 and applied to filter circuit 93.

Inverter 94 attempts to change the level of the potential at the output terminal of the filter circuit from "H" to "L" the change is prevented by capacitor C, resulting in irregular waveform and delay.

Waveform adjusting circuit 92, to which a signal moderately attaining to "L" from "H" level is applied from filter circuit 93, outputs a signal which has been inverted at a time t31 at which potential of the applied signal attains to Vhl, i.e., output clock signal OUTCLK which attains from "L" to "H" level.

The time between t30 and t31 corresponds to signal propagation delay time t between input of one of clock signals CLK1 to CLKn and output of output clock signal OUTCLK.

It is noted that the value of the propagation delay time due to filter circuit 93 and waveform adjusting circuit 95 must be designed to be constant regardless of the change in polarity of a signal input to filter circuit 93. More specifically, the propagation delay time must be the same if the propagated signal rises or falls.

To that end, it is necessary to provide a constant propagation delay time by equalizing a drivability ratio of PMOS and NMOS transistors of inverter 94 and optimizing the hysteresis property in waveform adjusting circuit 95.

If a clock signal whose clock phase is advanced by the time corresponding to signal propagation delay time d is selected and output by selector 91, the delay corresponding to signal propagation delay time d is offset, so that output clock signal OUTCLK, seemingly not adversely affected by signal propagation delay time d can be obtained.

More specifically, clock signal CLK1-p is applied to the first data input terminal of selector 91 instead of clock signal CLK1, and clock signal CLK2-p is applied to the second data input terminal instead of clock signal CLK2.

Similarly, clock signal CLKn-p is applied to the nth data input terminal instead of clock signal CLKn. Here, the value of "p" is an integer which is the closest to the value of n*d/T.

It is noted that T is a clock period of clock signals CLK1 to CLKn.

By the way, here, assume that the value of clock selection signal CSL changes to "b+1" representing clock signal CLKb+1 from "b" representing clock signal CLKb at a time t33.

Further, assume that the potential level of clock signal CLKb-p changes from "L" to "H" shortly before t33, and the potential level of clock signal CLKb+1-p changes from "L" to "H" shortly after t33.

At the time, selector 91 selects clock signal CLKb+1-p which has been applied to the (b+1)th data input terminal instead of clock signal CLKb-p which has been applied to the bth data input terminal at t33. Accordingly, the potential level of the output signal from selector 91 changes from "L" to "H" and to "L" and further to "H" immediately before and after t33. In other words, a hazard is caused to be the output signal from selector 91.

The output signal from selector 91 to which the hazard is caused is integrated by filter circuit 93. Thus, an amount of change in potential of the signal output from the output terminal of filter circuit 93 due to the hazard is reduced.

If the amount of change in potential is smaller than a hysteresis voltage width of waveform adjusting circuit 95 connected in the next stage, i.e., a value of Vhh-Vhl, the output terminal of waveform adjusting circuit 95 is not adversely affected by the hazard, so that output clock signal OUTCLK without any hazard can be obtained.

As described above, the third embodiment provides selector 91 supplied with a clock signal such that the clock signal number and the data input number representing the data input terminal differ by p, filter circuit 93 supplied with the output signal from selector 91, and waveform adjusting circuit 95 supplied with the output signal from filter circuit 93 for outputting output clock signal OUTCLK.

As a result, the propagation delay due to selector 91, filter circuit 93 and waveform adjusting circuit 95 can be canceled by selecting one of clock signals CLK1 to CLKn applied to selector 91 that has a phase advanced with respect to those of other signals.

Further, even if the hazard is caused to the output signal from selector 91 because of the timing of the transition point of clock selection signal CSL, the hazard is offset by filter circuit 93 and waveform adjusting circuit 95 in the next and following stages, so that the output clock signal without any hazard can effectively be obtained.

Furthermore, for actual implementation, the order of clock signals CLK1 to CLKn applied to n data input terminals of selector 91 may only be changed and additional HJW for preventing adverse affect by the propagation delay is not required.

It is noted that clock signals CLK1 to CLKn, which are prephase clock signals output from polyphase clock generation circuit 10, have the same frequency as the input data frequency of input data signal DIN. However, the relationship between the clock frequency and the input data frequency may be changed.

In other words, clock signals CLK1 to CLKn having the same frequency may be somewhat different from the input data frequency. Alternatively, the input data frequency may be somewhat higher or lower than the frequency of clock signals CLK1 to CLKn.

A normal operation of the digital synchronization circuit is ensured in the third embodiment even in this case.

Figure 12:
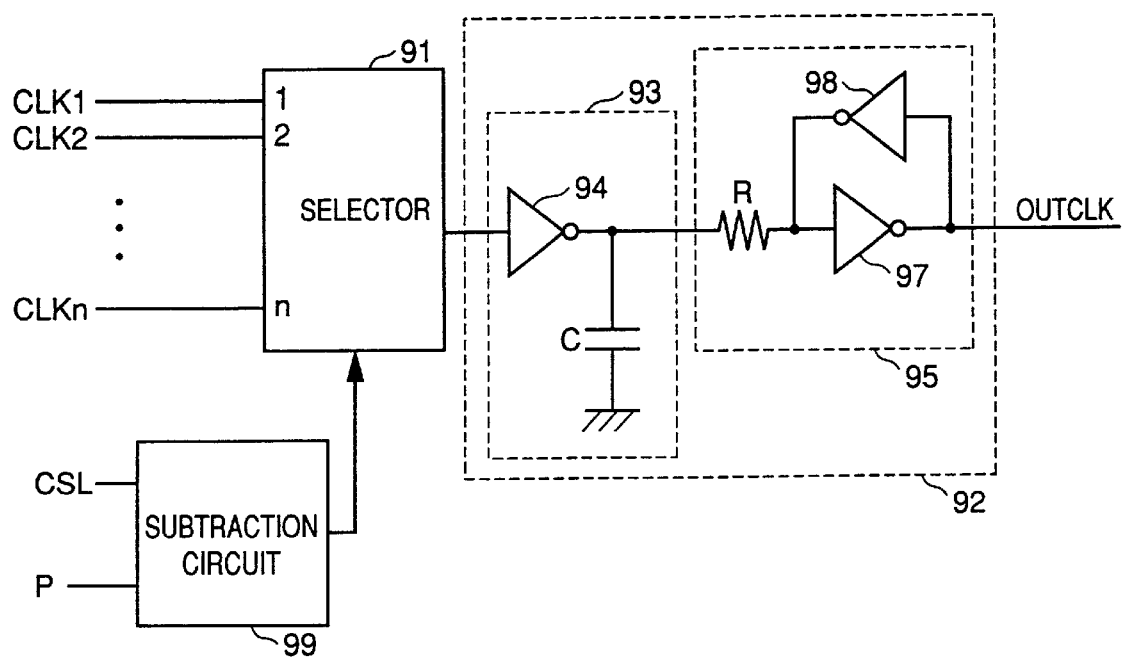
FIG. 12 is a diagram showing a structure of clock selection circuit 90A according to a third embodiment of the present invention.
Figure 13:
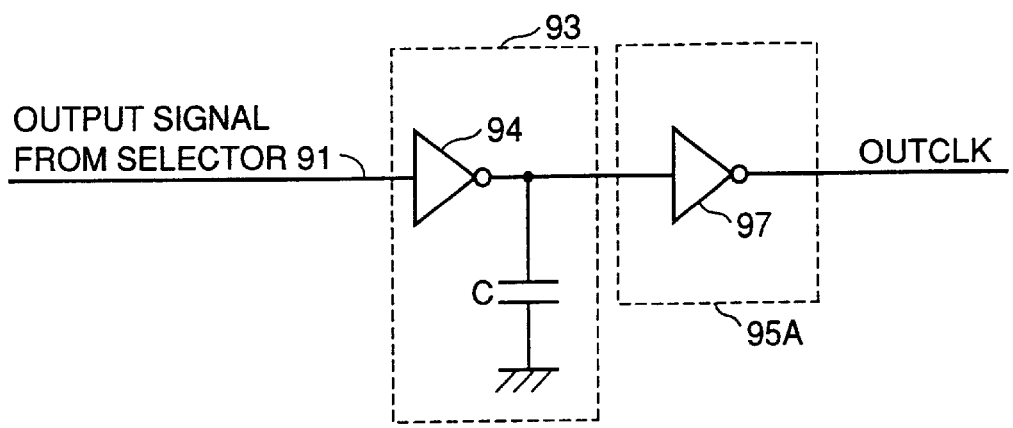
FIG. 13 is a diagram showing a structure of a waveform controlling circuit 92A.
Figure 14:
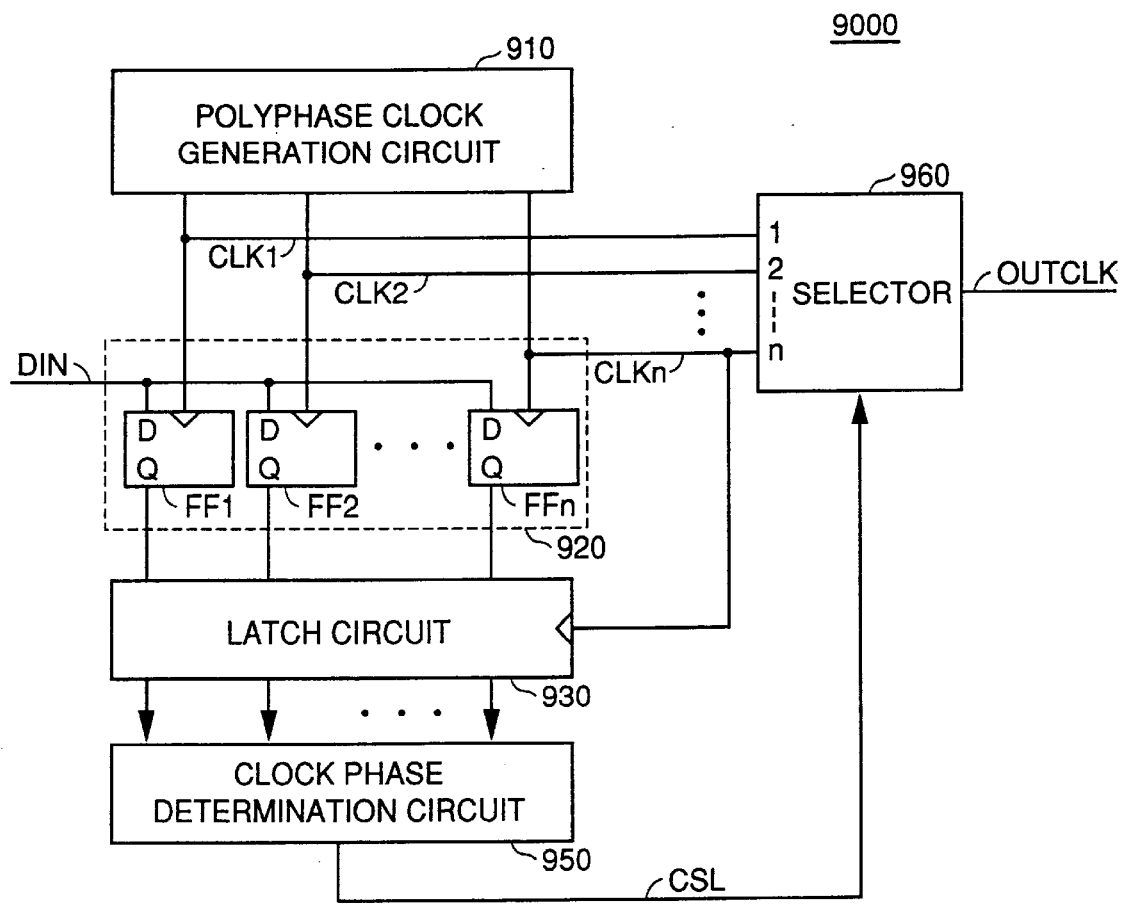
FIG. 14 is a block diagram showing a structure of conventional digital synchronization circuit 9000.
Figure 15:
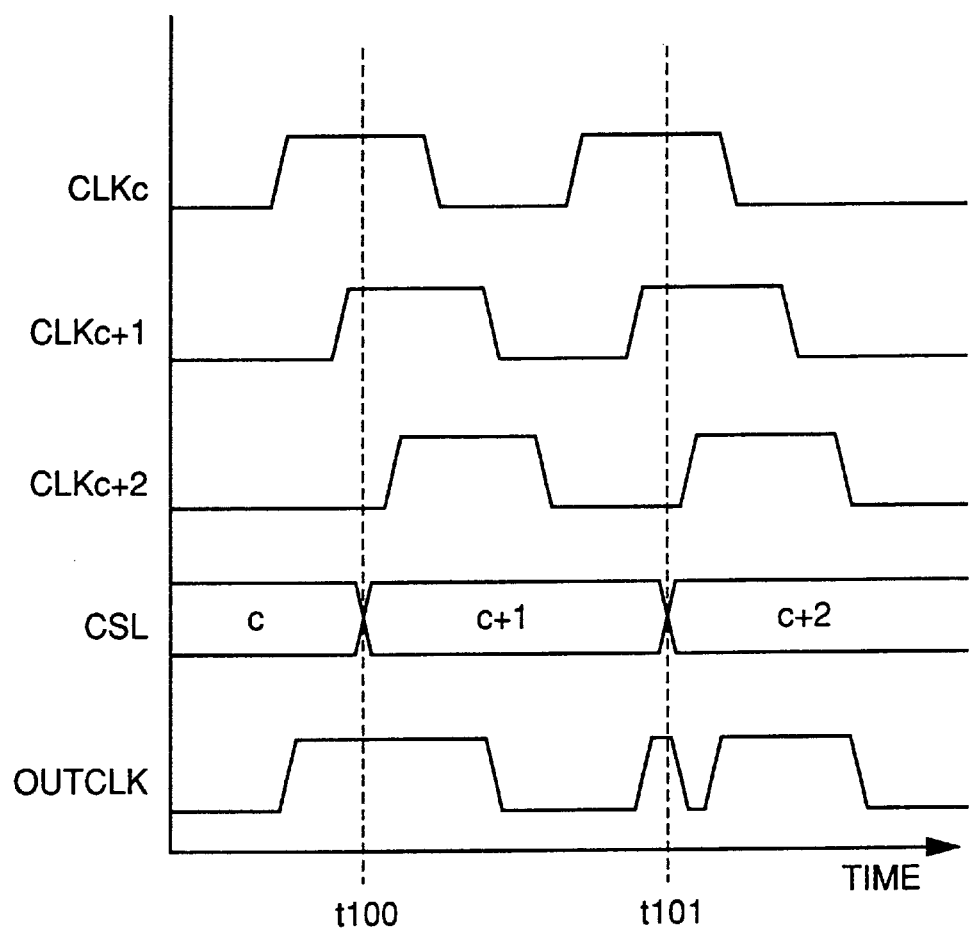
FIG. 15 is a timing chart shown in conjunction with an operation of digital synchronization circuit 9000 when a hazard is caused to an output clock signal.

Further, clock selection circuit 90A shown in FIG. 12 may be arranged in place of clock selection circuit 90.

Clock selection circuit 90A corresponds to the components of clock selection circuit 90 in addition to a subtraction circuit 99 supplied with a clock selection signal CSL, where the arrangement of clock signals CLK1 to CLKn supplied to selector 91 has been changed.

An arrangement of clock selection circuit 90A will be described. A clock selection signal CSL is applied to a minuend input terminal of subtraction circuit 99, and a subtrahend signal P is applied to a subtrahend input terminal of subtraction circuit 99. A subtraction output from subtraction circuit 99 is applied to the control input terminal of selector 91.

Further, clock signals CLK1 to CLKn are respectively applied to the first to the nth data input terminals of selector 91.

Next, an operation in conjunction with clock selection circuit 90A will be described.

Figure 10B:
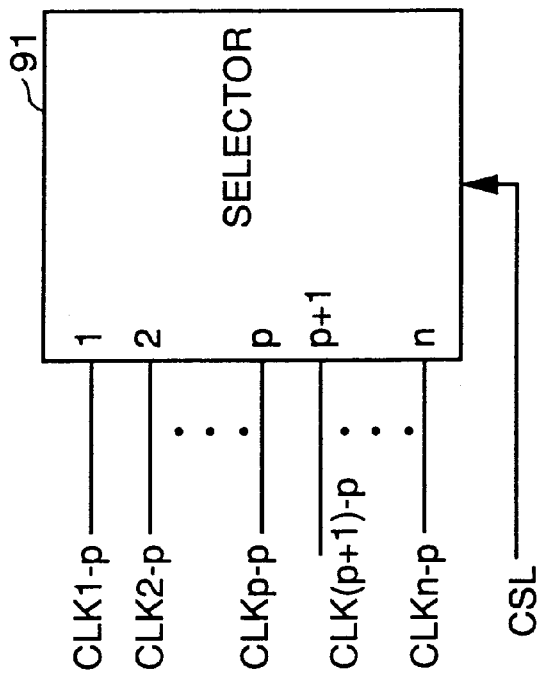

Subtrahend signal P has a value corresponding to "p" shown in FIGS. 10A and 10B.

Subtraction circuit 99 subtracts "p" applied to the subtrahend input terminal from the value of clock selection signal CSL applied to the minuend input terminal for outputting the subtraction result. An output from subtraction circuit 99 is applied to the control input terminal of selector 91.

If the value of clock selection signal CSL is "b" representing clock signal CLKb, the value of "b-p" is output from subtraction circuit 99.

When the value of "b-p" is input to the control input terminal of selector 91, clock signal CLKb-p which has been applied to the (b-p)th data input terminal of selector 91 is selected and output.

The subsequent operation is the same as in the case where clock selection circuit 90 is used, and therefore description thereof will not be repeated.

In this way, stable output clock signal OUTCLK without any hazard can be obtained.

Moreover, as in the case where clock selection circuit 90 is used, the adverse affect of the propagation delay due to selector 91, filter circuit 93 and waveform adjusting circuit 95 can be canceled by selecting one of clock signals CLK1 to CLKn applied to selector 91 that has a phase advanced with respect to those of other signals.

It is noted that although a Schmitt trigger is used as waveform adjusting circuit 95 in the above described embodiment, an inverter may be used.

Waveform controlling circuit 92A includes filter circuit 93 and a waveform adjusting circuit 95A.

Waveform adjusting circuit 95A includes an inverter 97. An input terminal of inverter 97 is connected to an output terminal of inverter 94. Output clock signal OUTCLK is output from an output terminal of inverter 97.

Here, the reason why inverter 97 may be used as the waveform adjusting circuit will be explained.

If a hazard is caused by selector 91, such a hazard is only caused before or after the potential level of the output signal from selector 91 changes from "L" to "H" or from "H" to "L". In addition, the output signal from selector 91 has equally the same periods of "H" and "L".

Accordingly, even if hazard is caused to the output signal from selector 91, the hazard component of the output signal from filter circuit 93 is caused when the potential level changes from "L" to an intermediate potential level close to "L," if the potential level of the output signal from filter circuit 93 changes from "L" to "H." Alternatively, if the potential level of the output signal from filter circuit 93 changes from "H" to "L," the hazard is caused when the potential level changes from "H" to the intermediate level close to "H."

Because of the above described property of the hazard component, the hysteresis property may not be provided as the waveform adjusting circuit.

Accordingly, a waveform adjusting circuit 95A including inverter 97 may be used instead of a Schmitt trigger circuit.

In this way, stable output clock signal OUTCLK without any hazard can be obtained.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital synchronization circuit comprising:
a clock generation circuit for generating a plurality of clock signals having substantially a same frequency and having different phases;
a selection circuit for selectively outputting corresponding one of said plurality of clock signals in accordance with a first selection signal;
a clock determination circuit for sampling an input data signal using said plurality of clock signals and selecting one of said plurality of clock signals based on said sampled result for outputting a second selection signal indicating the selection result; and
a selection control circuit for adjusting a timing of said second selection signal changes for outputting said first selection signal, said selection control circuit changing a value of said first selection signal from a first value to a second value in a period in which a potential of a clock signal represented by said first value and a potential of a clock signal represented by said second value are the same in response to a change in value of said second selection signal from said first value to said second value, wherein said selection control circuit includes:
a clock selection circuit for selectively outputting said clock signal represented by the value of said second selection signal of said plurality of clock signals, and
a latch circuit for latching said second selection signal for outputting said first selection signal in accordance with an output from said clock selection circuit.

2. The digital synchronization circuit according to claim 1, wherein said clock determination circuit selects one of said plurality of clock signals that changes with a prescribed phase relationship with respect to a transition timing of said input data signal for outputting said second selection signal representing said selected clock signal.

3. The digital synchronization circuit according to claim 2, wherein said clock determination circuit selects one of said plurality of clock signals having a rising or falling timing which is the closest to a specific timing of said input data signal in an inputting period.

4. A digital synchronization circuit comprising:
a clock generation circuit for generating a plurality of clock signals having substantially a same frequency and having different phases;
a selection circuit for selectively outputting corresponding one of said plurality of clock signals in accordance with a first selection signal;
a clock determination circuit for sampling an input data signal using said plurality of clock signals and selecting one of said plurality of clock signals based on said sampled result for outputting a second selection signal indicating the selection result; and
a selection control circuit for adjusting a timing of said second selection signal changes for outputting said first selection signal, said selection control circuit changing a value of said first selection signal from a first value to a second value in a period in which a potential of a clock signal represented by said first value and a potential of a clock signal represented by said second value are the same in response to a change in value of said second selection signal from said first value to said second value, wherein said selection control circuit includes
a clock selection circuit having a plurality of first data input terminals arranged in correspondence with said plurality of clock signals and supplied with corresponding clock signals, a first control input terminal supplied with said second selection signal, and a first output terminal, and configured for selecting one of said plurality of first data input terminals in accordance with said second selection signal for outputting a clock signal applied to the selected first data input terminal from said first output terminal, and
a latch circuit having a clock input terminal supplied with a clock signal output from said first output terminal, a second data input terminal supplied with said second selection signal, and a second output terminal, and configured for latching said second selection signal in accordance with an input to said clock input terminal for outputting said first selection signal from said second output terminal, wherein said selection circuit includes a plurality of third data input terminals arranged in correspondence with said plurality of clock signals and supplied with corresponding clock signals, a second control input terminal supplied with said first selection signal, and a third output terminal, and selects one of said plurality of third data input terminals in accordance with said first selection signal for outputting a clock signal applied to the selected third data input terminal from said third output terminal.

5. The digital synchronization circuit according to claim 4, further comprising a plurality of signal lines for transmitting said plurality of clock signals, wherein said plurality of signal lines are connected to said plurality of first data input terminals and said plurality of third data input terminals such that the clock signals respectively input to said first and third data input terminals represented by values of said second and first selection signals are the same when said values of said second and first selection signals are the same.

6. The digital synchronization circuit according to claim 4, further comprising a plurality of signal lines for transmitting said plurality of clock signals, wherein said plurality of signal lines are connected to said plurality of first data input terminals and said plurality of third data input terminals such that a prescribed phase difference is obtained between phases of the clock signals respectively input to said first and third data input terminals represented by values of said second and first selection signals when the values of said second and first selection signals are the same.

7. The digital synchronization circuit according to claim 4, wherein said clock determination circuit selects one of said plurality of clock signals that changes with a prescribed phase relationship with respect to a transition timing of said input data signal for outputting said second selection signal representing said selected clock signal.

8. The digital synchronization circuit according to claim 4, wherein said clock determination circuit selects one of said plurality of clock signals having a rising or falling timing which is the closest to a specific timing of said input data signal in an inputting period.

* * * * *

UNITED STATES PATENT AND TRADEMARK OFFICE
CERTIFICATE OF CORRECTION

PATENT NO. : 6,751,745 B1
DATED : June 15, 2004
INVENTOR(S) : Tsutomu Yoshimura et al.

It is certified that error appears in the above-identified patent and that said Letters Patent is hereby corrected as shown below:

Title page,
Item [75], Inventors, change "Tsutomo" to -- Tsutomu --.

Signed and Sealed this

Third Day of May, 2005

JON W. DUDAS
*Director of the United States Patent and Trademark Office*